March 5, 1963 W. J. MUNLEY, JR., ETAL 3,080,378
PREPARATION OF METADIOXANES
Filed Dec. 7, 1960
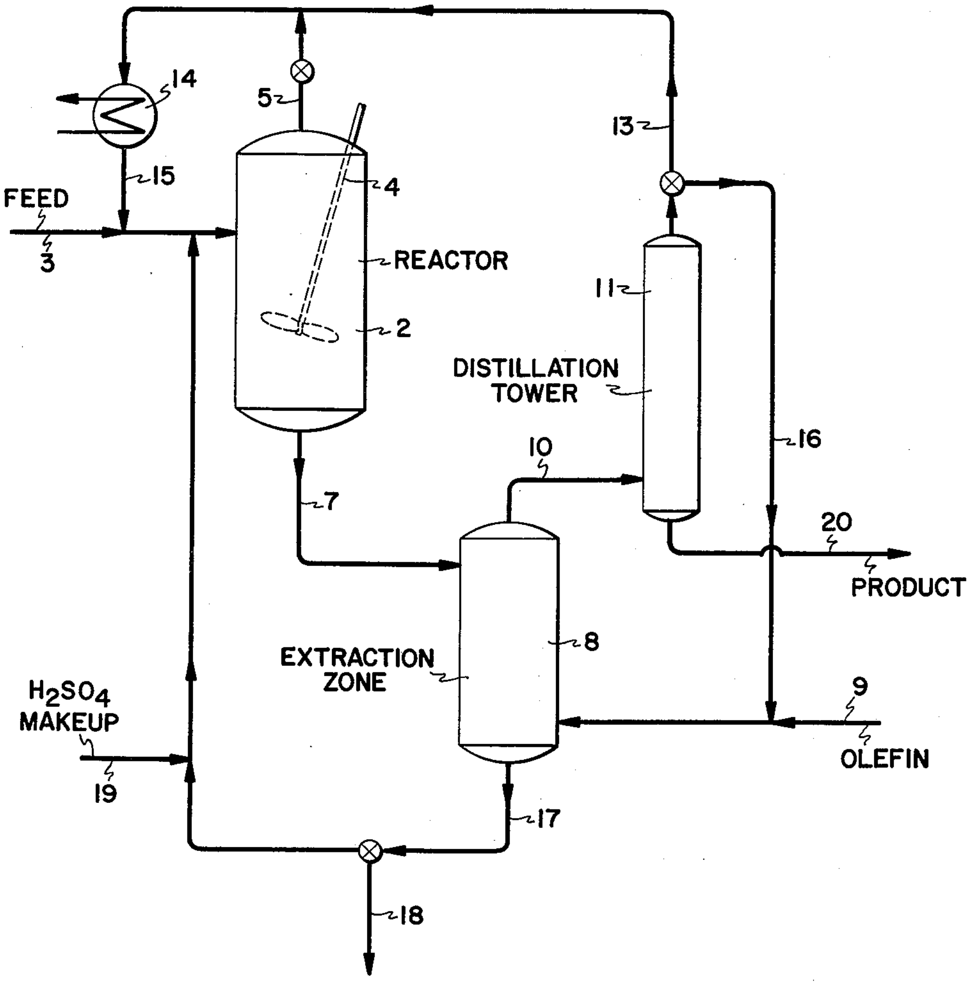
William J. Munley, Jr.
Lester W. Zeager INVENTORS
William E. Catterall
BY R. B. Monahan
PATENT ATTORNEY United States Patent Office 3,080,378
Patented Mar. 5, 1963

3,080,378

PREPARATION OF METADIOXANES

William J. Munley, Jr., North Plainfield, Lester W. Zeager, South Plainfield, and William E. Catterall, Summit, N.J., assignors to Esso Research and Engineering Company, a corporation of Delaware Filed Dec. 7, 1960, Ser. No. 74,269
9 Claims. (Cl. 260—340.7)

The present invention relates to a process for making metadioxanes, sometimes called cyclic dioxides, and glycols. More particularly, it concerns the preparation of an alkyl-substituted metadioxane by the condensation of a lower molecular weight aliphatic olefin and an aldehyde in the presence of an acid catalyst, recovering the metadioxane by extracting the reaction mixture with the same olefin used in the reaction, separating the olefin from the metadioxane and transferring the olefin to the reaction zone. Metadioxanes having one or more $C_1$ to $C_4$ groups are useful as solvents. They can be readily converted into high purity glycols that can be used as humectants by alcoholysis. The glycols can be further reacted with acids to make resin plasticizers.

In the conventional method for making metadioxanes, a monoolefin, such as propylene, is reacted with a lower molecular weight aldehyde, such as formaldehyde, in an aqueous solution of sulfuric acid at elevated temperatures and superatmospheric pressure. Upon completion of the reaction, the organic and aqueous layers are separated with the assistance of a salt, such as sodium sulfate. The metadioxane is then recovered from the organic layer by distillation. In one process the reaction mixture is neutralized, then steam distilled and the metadioxanes in the distillate are salted out, separated and dried.

An object of the present invention is to simplify the recovery used in the conventional metadioxane processes.

Another object of the invention is to produce essentially pure, water-free metadioxanes by extracting the reaction mixture with fresh olefin feed.

Other objects and advantages will be apparent from the description of the invention.

It has now been discovered that metadioxanes can be rapidly and simply recovered from an aqueous reaction mixture by extracting the liquid mixture with the same olefin used in the preparation of the product. For instance, 1,3-butylene glycol cyclic formal can be extracted from a reaction mixture containing substantial quantities of water and catalyst and small amounts of propylene and formaldehyde, by contacting it with propylene, or a hydrocarbon cut rich in propylene, in a countercurrent or concurrent extraction tower. The cyclic formal product can be recovered from the fat propylene solvent by flashing the olefin or distilling it off under pressure. The propylene is then recycled to the reaction zone where it is condensed with fresh formaldehyde in the presence of the acid catalyst. A part of the aqueous phase withdrawn as bottoms from the extraction tower may be purged and the residue can be returned to the condensation reaction together with sufficient make-up catalyst to replace the catalyst in the purge stream.

The lower molecular weight aliphatic hydrocarbon olefin used to prepare the metadioxanes is generally a primary or secondary olefin containing 3 to 6 carbon atoms. Among the monoolefins which can be used are 2-methyl butene-1, butene-2, pentene-1, hexene-1 and especially propylene. Usually, the more reactive secondary olefins require a less concentrated acid catalyst than the primary olefins, e.g. 30 wt. percent vs. 60 wt. percent. In any event, the catalyst concentration should be adjusted to prevent the reactants or the product from polymerizing.

Aldehydes that are suitable for use in this process include paraformaldehyde, formalin, other polymers of formaldehyde, acetaldehyde, propionaldehyde or any compounds capable of yielding lower molecular weight aldehydes, i.e. $C_1$ to $C_4$ aldehydes, under the reaction conditions, such as dimethyl acetal also known as methylal.

The conventional condensation catalysts are sulfuric acid, hydrochloric acid and phosphoric acid. The acid concentration in the reaction mixture should be about 3 to 10 wt. percent. Aside from the mineral acids, inorganic acid salts, such as zinc chloride, can also be utilized.

In carrying out the condensation step, a pressure vessel is charged with the reactants and aqueous catalyst solution, and the resulting mixture is agitated with an efficient stirrer, or other agitating means, until the reaction is substantially complete. Sufficient pressure is employed to provide a reaction mixture having a hydrocarbon liquid phase. Upon completion of the reaction, the contents of the vessel may be cooled and any excess olefin reactant or other gaseous product bled off prior to transferring the liquid reaction mixture to a liquid extraction tower where it is contacted with an olefin solvent stream. In a preferred embodiment the liquid reaction mixture is fed directly to the extraction zone where it is selectively extracted under substantially the same pressure. The metadioxane product extracted by the olefin is recovered by distilling the olefin absorbent from the extract or by flashing the olefin from a flash drum communicating with the extraction tower. The olefin, which is the same as the olefin reactant, is pressurized, if necessary, and sent to the reactor.

The metadioxane prepared in accordance with the above process usually contains less than 5 wt. percent water, and frequently the water content is less than 1 wt. percent. The pure, water-free metadioxanes have a much greater utilization than the contaminated products obtained by other methods.

The condensation reaction is generally effected at temperatures of about 110° to 160° C. and preferably at about 130–150° C. The pressure in the reaction vessel is substantially equal to that exerted by the monoolefin reactant, which is usually between about 100 and 1000 p.s.i.g. at temperatures of 110 to 160° C.

The mole ratio of monoolefin to aldehyde in the reactor is usually about 0.5 to 1:1 and preferably is about 0.6:1. While stoichiometric amounts of the reactants can be used, i.e. 2 moles of aldehyde per mole of olefin, it is preferred to use excess olefin, e.g. 10–30% excess.

The mole ratio of acid catalyst to aldehyde reactant is usually about 0.1 to 0.5:1 and preferably about 0.2:1. Enough water should be added to the reaction vessel so that the catalyst is relatively dilute, e.g. about 3 to 10 wt. percent based on the water. The catalyst concentration will of course vary according to the reactivity of the olefin and aldehyde feeds. Generally speaking, the mole ratio of water to aldehyde should be between about 5 to 30:1.

The invention will now be described with reference to the accompanying drawing which is a flow diagram of the process.

Formalin (36.2 wt. percent formaldehyde), dilute sulfuric acid (5 wt. percent) and propylene are fed into reactor 2 through line 3. The reactor is cooled so that the temperatrue of the aqueous mixture in the reactor does not rise substantially above room temperature. Propylene is then added to the reactor, which is a pressure vessel capable of withstanding pressures up to 1000 p.s.i.g., via line 3 until the pressure inside the reactor is about 175 p.s.i.g. The reactor is then heated to about 140° C. and the mixture is agitated for up to 5 hours with a stirrer 4. The reaction time of course varies with the conversion desired. The conversion at a given temperature is regulated by adjusting the acid strength. In some instances the reaction period is as short as a few minutes while in other instances the reactants are allowed to react for several hours. Conversions of the order of 80% have been obtained with residence times as low as 15 minutes by operating under optimum conditions. Upon complete of the reaction, e.g. after 3 hours, the liquid portion of the reaction mixture which consists of an organic layer and an aqueous layer, is drawn off through line 7 and pumped to the top of the extraction zone 8 which is usually a baffled tower having about 5 theoretical plates. In one embodiment, the olefin, i.e. propylene, is simultaneously fed into the bottom of the extraction zone through line 9 under pressure e.g. 500 p.s.i.g. The propylene in the extraction zone flows upwardly and countercurrently to the downflowing liquid reaction mixture containing 1,3-butylene glycol cyclic formal. The propylene intimately contacts the aqueous reaction mixture as it rises to the top of the tower and selectively extracts the metadioxane product. The propylene solvent rich in formal is withdrawn from the top of extraction zone 8, which is at about 500 p.s.i.g. pressure and about 75° C., via line 10 and transferred to a distillation tower 11 which is at approximately 200° C. wherein the propylene absorbent is vaporized off overhead through line 13 which communicates with line 5. The propylene is condensed with cooling water in an exchanger 14 prior to introducing the propylene recycle into reactor 2 via lines 15 and 3. If desired, a portion of the propylene in line 13 can be recycled to extraction zone 8 through lines 16 and 9. The formal product is withdrawn as bottoms from the distillation tower 11 through line 20. The product may either be used as such, e.g. as a solvent for resins, or it may be subjected to methanolysis in the presence of catalytic quantities of sulfuric acid to form 1,3-butylene glycol, a humectant.

The amount of olefin absorbent fed into the bottom of the extraction zone will vary with the volume of liquid effluent. In general, the volume ratio of olefin absorbent to the liquid reaction mixture should be between about 0.1 to 20:1, and preferably about 0.5 to 2:1.

While the temperature in the extraction zone is preferably between 75 and 250° C., it can be as low as 50° C. if the reaction mixture is cooled and the metadioxane is recovered by flashing the olefin absorbent. The pressure in the liquid-liquid extraction tower is usually between about 100 and 1000 p.s.i.g. The pressure in the tower essentially represents the pressure exerted by the olefin feed passing through it and is preferably about 450 to 700 p.s.i.g.

The extracted liquid reaction mixture, which consists mainly of dilute sulfuric acid solution with some unextracted metadioxane, is withdrawn from the bottom of extraction zone 8 through line 17 and recycled to reactor 2 through line 3. Line 17 is also connected with a purge line 18 which allows the removal of a portion of the aqueous recycle solution to avoid a buildup of water in the reactor. Makeup sulfuric acid is introduced through line 19 which communicates with recycle line 17 containing the extracted aqueous residue. Sufficient makeup acid is added to the system to maintain the initial acid concentration in reactor 2.

The above-described process may be carried out batchwise as well as continuously, if such is desired. Other modifications which come within the scope of the invention are the use of an olefin feed containing some paraffinic hydrocarbons, usually having the same carbon number, and the use of organic acid catalysts, such as toluene sulfonic acid, in place of the conventional mineral acids and acid acting salts.

The present process has special application to the preparation of glycols, such as 1,3-butanediol. In the conventional method the glycol is formed in a single reactor by reacting 1 mole of formaldehyde with 1 mole of, say, propylene in an aqueous medium containing a catalytic amount of a mineral acid, e.g. 1 to 15 wt. percent sulfuric acid, at about 130 to 160° C. under about 500 to 1000 p.s.i.g. for about 20 hours or more. At the end of this time the unreacted propylene is vented, the aqueous reaction mixture is neutralized and the dioxane is distilled off and return to the reactor to be converted to glycol. The undistilled portion of the reaction mixture is filtered to remove the insoluble salts and vacuum distilled to recover the glycol product. The residue consists mainly of polyglycols. The described conventional process has several disadvantages including long reaction times, low selectivity and substantial formaldehyde losses.

In contradistinction, the process described herein can be carried out in combination with an alcoholysis reaction to make pure glycol, i.e. 99% pure. For example, the pure metadioxane product can be continuously treated with a stoichiometric amount or an excess of a low molecular weight alkanol in the presence of a mineral acid catalyst for about 1 to 5 hours at an elevated temperature and atmospheric to superatmospheric pressure to form a 1,3-alkanediol. To be specific, 1 mole of 4-methylmetadioxane is reacted with about 3 moles of methanol and 0.05 mole of sulfuric acid (96 wt. percent in water) at 65 to 80° C. for about 3 hours at atmospheric pressure. The methylal by-product is continuously stripped from and recycled if desired to the metadioxane reaction zone.

The following is a description of a specific embodiment of a batch process for making metadioxanes.

Water (1280 g.), 332 g. of formalin (36.2 wt. percent formaldehyde) and 79 g. of 98% sulfuric acid were added to a one gallon autoclave equipped with a reciprocal mixer. The autoclave reactor was cooled with cold water during the addition of the liquids to prevent any substantial rise in temperature. Propylene was then introduced into the autoclave to bring the pressure to about 175 p.s.i.g. This is equivalent to about 238 g. of propylene. The cooling water was then turned off and the autoclave was heated to 140° C. and the reaction mixture was agitated in case there was an upper hydrocarbon layer and a lower aqueous layer present throughout the reaction. After 4 hours the reactor was cooled to approximately room temperature and the unreacted propylene was vented. The reaction mixture, containing the metadioxane was then extracted with pure propylene at 75° C. and 335 p.s.i.g. final pressure. The propylene and aqueous solutions were stirred to insure intimate contact and a sample was removed from the aqueous layer and analyzed for metadioxane.

The extraction coefficient was calculated to be 4.16. The extraction coefficient is equal to the molar ratio of the metadioxane in the hydrocarbon phase to the metadioxane in the aqueous phase. The foregoing shows that propylene is an excellent extractant for metadioxanes. It has also been found that the coefficient increases with temperature. Therefore it is desirable to use higher temperatures, i.e. about 50 to 250° C. in the extraction step.

The metadioxane, i.e. 4-methyl-metadioxane, in the propylene is easily recovered by drawing off the aqueous layer and flashing or venting the propylene in the organic layer leaving a residue consisting essentially of the metadioxane product.

It is not intended to restrict the present invention to the specific examples which are given merely to demonstate one embodiment of the invention. Other metadioxanes, such as 4,4-dimethyl metadioxane and 4-n-propyl metadioxane, can be made by this process. Therefore, the invention should be limited only by the appended claims in which it is intended to claim all the novelty inherent in the discovery as well as all the modifications and equivalents coming within the scope and spirit of the invention.

What is claimed is:

1. A process according to claim 6 in which the olefin is propylene.

2. A process according to claim 6 in which the aldehyde is formaldehyde.

3. A process according to claim 7 in which the extraction is effected under 100 to 700 p.s.i.g. pressure and at about 50° to 250° C.

4. A process according to claim 7 in which the mineral acid catalyst is sulfuric acid.

5. A process according to claim 7 in which the metadioxane is extracted at substantially the same pressure used in the reaction zone.

6. In a process for preparing metadioxanes which comprises reacting an aliphatic $C_3$ to $C_6$ hydrocarbon olefin with a lower molecular weight aldehyde in a reaction zone under superatmospheric pressure and at elevated temperatures in the presence of an aqueous acid catalyst solution thereby forming a metadioxane, withdrawing at least a portion of the metadioxane-containing reaction mixture, and recovering the metadioxane from said reaction mixture, the improvement which comprises contacting the withdrawn reaction mixture in an extraction zone with fresh aliphatic $C_3$ to $C_6$ hydrocarbon olefin liquid, which is the same as that used in the reaction to form the metadioxane, thereby extracting the metadioxane from the withdrawn reaction mixture and recovering an extracted reaction mixture and the hydrocarbon olefin liquid containing metadioxane, passing the fresh hydrocarbon olefin containing metadioxane into a distillation zone, distilling the hydrocarbon olefin liquid containing metadioxane thereby recovering hydrocarbon olefin overhead and a substantially water-free metadioxane as a bottoms product from said distillation zone, passing at least a part of the distilled hydrocarbon olefin and recycling at least a part of the extracted reaction mixture to said reaction zone.

7. In a process for preparing metadioxanes which comprises reacting an aliphatic $C_3$ to $C_6$ hydrocarbon olefin with a lower molecular weight aldehyde in a reaction zone in a molar ratio of about 0.5 to 1:1 in the presence of an aqueous mineral acid catalyst solution at about 110 to 160° C. and under sufficient pressure to maintain the hydrocarbon olefin in the liquid phase thereby forming a metadioxane, withdrawing at least a portion of the metadioxane-containing reaction mixture, and recovering the metadioxane from said reaction mixture, the improvement which comprises contacting the withdrawn reaction mixture in an extraction zone with fresh aliphatic $C_3$ to $C_6$ hydrocarbon olefin liquid, which is the same as that used in the reaction to form the metadioxane, thereby extracting the metadioxane from the withdrawn reaction mixture and recovering and extracted reaction mixture and hydrocarbon olefin liquid containing metadioxane, passing the fresh hydrocarbon olefin containing metadioxane into a distillation zone, distilling the hydrocarbon olefin liquid containing metadioxane thereby recovering the fresh hydrocarbon olefin overhead and a substantially water-free metadioxane as a bottoms product from said distillation zone, passing at least a part of the distilled hydrocarbon olefin and recycling at least a part of the extracted reaction mixture to said reaction zone.

8. In a continuous process for preparing 1,3-butylene glycol cyclic formal which comprises continuously mixing propylene and formaldehyde in a reaction zone in a molar ratio of about 0.5 to 1:1 with aqueous sulfuric acid under pressures of 100 to 1000 p.s.i.g. and temperatures of 110 to 160° C. thereby forming said cyclic formal, continuously withdrawing at least a part of the cyclic formal-containing reaction mixture from the reaction zone and recovering the cyclic formal product from the withdrawn reaction mixture, the improvement which comprises continuously extracting the formal in the withdrawn reaction mixture with liquid propylene in a countercurrent extraction zone at 75° to 250° C. and under 450 to 700 p.s.i.g. pressure and recovering the extracted reaction mixture and liquid propylene containing cyclic formal, continuously passing the liquid propylene-containing cyclic formal to a distillation zone, continuously distilling the propylene-containing cyclic formal thereby recovering propylene overhead and a substantially pure water-free cyclic formal as a bottoms product from said distillation zone, continuously passing at least a part of the distilled propylene and continuously recycling at least a part of the extracted reaction mixture to the reaction zone.

9. A process according to claim 8 in which a part of the distilled propylene is recycled to the extraction zone.

References Cited in the file of this patent

UNITED STATES PATENTS

| | | |
|---|---|---|
| 2,421,862 | Arundale et al. | June 10, 1947 |
| 2,490,276 | Munday et al. | Dec. 6, 1949 |
| 8,962,507 | Hellin et al. | Nov. 29, 1960 |